April 7, 1936. R. G. JEWELL 2,036,811
DAMPING ARRANGEMENT FOR DEFLECTING INSTRUMENTS
Filed April 27, 1935
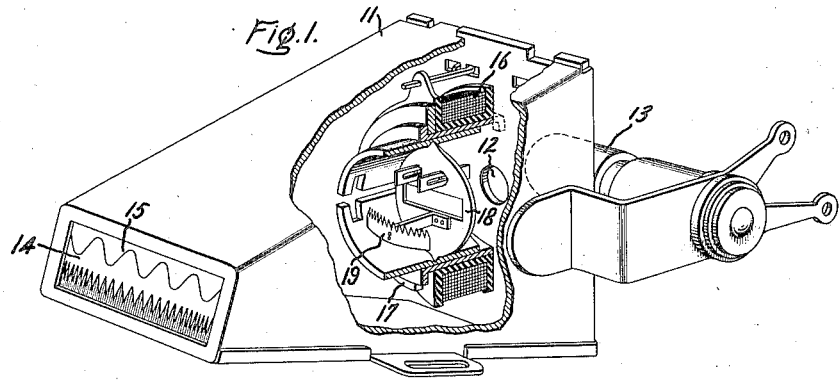
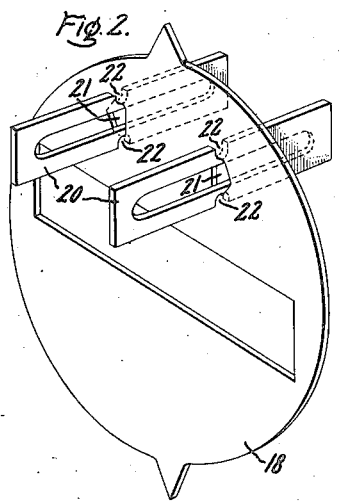
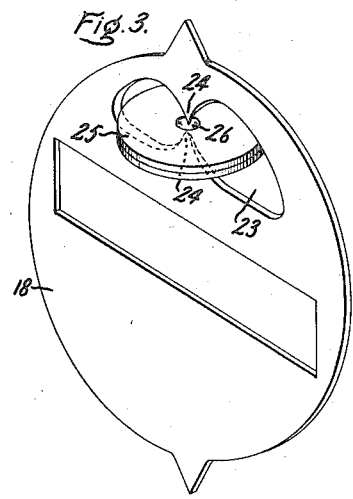
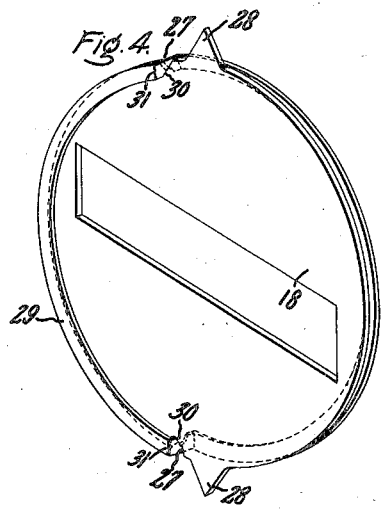
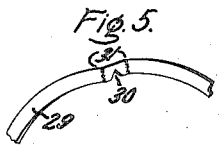
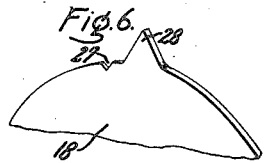
Inventor:
Richard G. Jewell,
by Harry E. Dunham
His Attorney.

Patented Apr. 7, 1936

2,036,811

UNITED STATES PATENT OFFICE 2,036,811

DAMPING ARRANGEMENT FOR DEFLECTING INSTRUMENTS

Richard G. Jewell, Lynn, Mass., assignor to General Electric Company, a corporation of New York Application April 27, 1935, Serial No. 18,702

8 Claims. (Cl. 188—103)

My invention relates to deflecting instruments and concerns particularly damping devices for such instruments.

The object of my invention is to provide a simple, inexpensive, and highly effective damping arrangement for deflecting instruments and devices and especially a damping arrangement which has no tendency to cause sticking of moving elements.

In carrying out my invention in its preferred form, I utilize an inertia member movably mounted upon a moving element of an instrument to promote damping. The mounting is arranged in such a manner that the moving element is brought to rest through the dissipation of its kinetic energy by friction between the moving element and the inertia member, or by impacts between the moving element and the inertia member, or by both friction and impact.

The features of my invention which I believe to be novel and patentable will be pointed out in the claims appended hereto. A better understanding of my invention may be obtained from the following description taken in connection with the accompanying drawing in which Fig. 1 represents in perspective a deflecting electrical instrument incorporating one embodiment of my invention; Fig. 2 is a detailed perspective view of the moving element of the instrument illustrated in Fig. 1; Fig. 3 is a perspective view of a moving element illustrating another embodiment of my invention; Fig. 4 illustrates still another embodiment of my invention; and Figs. 5 and 6 are fragmentary views illustrating more in detail certain portions of the construction of Fig. 4.

In Fig. 1, I have illustrated the manner of applying one embodiment of my invention in order to damp the motion of the moving element of a current-responsive deflecting instrument of a type suitable for use as a shadow-tuning meter in radio receivers. It will be understood, however, that my invention is not limited thereto but is applicable to and useful in instruments and other deflecting devices of other types and for other purposes. Like reference characters are utilized to designate like parts throughout in the drawing.

The shadow-tuning instrument illustrated in Fig. 1 comprises a housing 11 having an aperture 12 at one end to admit a beam of light from a lamp 13, and a translucent screen 14 at the other end carrying a suitable scale index, divisions, or merely markings 15. The current-responsive mechanism consists of a current-conducting coil 16 which is coaxial with a C-shaped permanent magnet 17 and has movably mounted within it a vane 18 of magnetizable material. It will be readily understood that the permanent magnet 17 tend to bias the vane 18 to a position with its plane perpendicular to the axis of the coil 16, whereas the magnetic field produced by current flowing in the coil 16 tends to deflect the vane 18 to bring it to a plane parallel with the axis of the coil 16.

A saw-toothed shutter 19 is carried by the movable vane 18 and casts an image upon the translucent screen 14, which travels along the translucent screen in response to deflection of the movable element or vane 18. In such an instrument, it is desirable to provide damping means or means for bringing the movable element to rest as quickly as possible after each change in values of current flowing in the coil 16. However, owing to the fact that the instrument is of an inexpensive type with the construction simplified to the greatest extent possible, any acceptable form of damping device must also be very simple in construction and relatively inexpensive.

In keeping with these aims, I have provided the moving element 18 with inertia members 20 which are supported in openings or recesses 21 cut in the vane 18. Preferably the inertia members 20 are provided with notches or recesses 22. The edges of the openings 21 cooperate with the notches 22 in the inertia members 20 in order to hold the inertia members 20 securely yet movably within the openings 21. The inertia members 20 are formed from sheets of bendable material and the openings 21 are of such size and shape that the inertia members 20 may be bent sufficiently to permit mounting the members 20 in the openings 21. When inserted, the members 20 are again bent back to their flat form, shown in the drawing, with the notches 22 cooperating with the edges of the openings 21.

It will be apparent that, when the instrument is in operation and the moving element 18 deflects in either direction, the members 20, by virtue of their inertia, will tend to lag behind the moving element 18. However, the edges of the openings 21 and the notches 22 act as stops which force the inertia members 20 to follow the motion after the member 18 has moved through a predetermined angle. When the moving element 18 has momentarily ceased moving at an extremity of its motion, the inertia members 20 will, of course, tend to continue in motion until halted by the edges of the openings 21 and the notches 22 coming together. Energy will be dissipated both by the friction between the inertia members 20 and the vane 18 when these parts move relatively, and by the impact between these parts when the inertia members 20 are set in motion or brought to rest. This energy can be derived only from the energy of the moving element 18 and, therefore, its kinetic energy is soon dissipated and it is brought to rest.

I have found that a very appreciable amount of energy is absorbed in impact and, therefore, the arrangement shown in Figs. 1 and 2 is exceptionally effective for bringing the moving element to rest quickly.

However, friction alone may also be depended upon to bring the moving element to rest promptly. In Fig. 3, I have illustrated a modified construction of moving element 18 in which an opening or recess 23 is cut out in such a manner as to leave two points 24 directed toward each other to serve as pivots for the frictionally engaging inertia member. The inertia member may be in the form of a disc 25 consisting, for example, of a pair of discs stamped from sheet metal and having recesses such as depressions or sockets 26 therein cooperating with the pivot points 24. When mounting the disc 25, one or both of the points 24 are bent out in order to permit inserting the disc 25 and, when the points 24 are bent back into position, the clearance is such that the disc 25 is free to rotate within the opening 23. However, as the element 18 deflects, the inertia member 25 tends to drag behind and the kinetic energy of the element 18 is dissipated in the form of friction at the pivot points 24 and brings the moving element to rest.

A modified construction is illustrated in Fig. 4 which causes the moving element to be brought to rest by absorbing energy both by friction and by impact. This construction has the further advantage that it is especially easy to manufacture, and the inertia member may very easily be inserted in place without requiring further adjustment. The construction also readily permits mounting the inertia member after the other parts of the instrument have been assembled.

In accordance with the embodiment illustrated in Fig. 4, the vane 18 serving as the moving element is provided with the notches 27 which may, if desired, conveniently both be at one side of the pivots 28 by which the vane 18 is mounted. An inertia member 29 is provided which is in the form of a flat ring which may be stamped at very little cost from sheet material. The ring 29 is provided with notches 30 to cooperate with the notches 27 in the vane 18. Preferably, the ring 29 is bent at right angles at the points 31 on either side of the notches 30 in order to permit the rings 29 to lie close to the surfaces of the vane 18. As in the arrangement of Fig. 2, the edges of the notches 27 and 30 serve as stops which permit relative motion through a small angle between the inertia ring 29 and the vane 18. In like manner, the dissipation of energy by friction and impact at the edges of the notches 27 and 30 serves to bring the moving element to rest.

It is evident that the damping arrangements constructed in accordance with my invention do not impair the freedom of motion of the moving element in any manner and, therefore, do not tend to cause the moving element to stick in any position.

In accordance with the provisions of the patent statutes, I have shown and particularly described certain embodiments of my invention and the principles of operation thereof but it will be understood that my invention is not limited to the specific constructions set forth but may be carried out in any manner within the scope of the appended claims.

What I claim as new and desire to secure by Letters Patent of the United States, is:—

1. In a deflecting instrument, the combination of a movable element, and an inertia member movably mounted upon said movable element but so arranged thereon as to be restricted to relative motion through a predetermined angle with respect to said movable element, whereby the inertia member dissipates energy through impact whenever the inertia member comes to the end of its permitted angle of relative motion.

2. In a deflecting instrument, the combination of a movable element in the form of a flat sheet having openings cut therein, an inertia member in the form of a sheet having notches therein, said notches being spaced to correspond to the edges of the openings in said movable element, and said inertia member being supported in said openings in said movable element.

3. In a deflecting instrument, the combination of a movable element in sheet form, an inertia member having notches therein, said movable element being recessed to receive the notched portion of said inertia member, the arrangement being such that the inertia member is movably mounted upon the movable member with relative movement between the movable element and the inertia member limited to a predetermined angle.

4. In a deflecting instrument, the combination of a movable element in sheet form and an inertia member in sheet form having recesses therein, said movable element having recesses to receive said inertia member, the edges of the recesses in said movable element being arranged to cooperate with the recesses in the inertia member to retain the latter pivotally in supported relation on said movable element.

5. In a deflecting instrument, the combination of a movable element in sheet form and a disc-shaped inertia member having depressions in the centers of the flat surfaces thereof, said movable element having recesses to receive said inertia member, the edges of the recesses in said movable element being shaped to form a pair of cooperating pivots adapted to be received by the depressions in the said inertia member to retain the latter pivotally in supported relation on said movable element.

6. In a deflecting instrument, the combination of a movable element in sheet form and an inertia member comprising a ring formed of sheet material conforming substantially in outline to the shape of said movable element, notches in the edges of said movable element adapted to receive said inertia member, and notched portions in said inertia member cooperating with notches in said movable element to retain the inertia member pivotally in supported relation on said movable element with a restricted angle of relative movement.

7. A damping arrangement for a deflecting instrument comprising in combination with the movable element therefor, an inertia member adapted to produce an impact against said movable element whenever the direction of acceleration of the movable element changes.

8. In a deflecting instrument having a movable element, a damping arrangement comprising in combination with the movable element, a damping element pivotally mounted thereon and stops included in said elements for limiting relative angular motion thereof to dissipate energy by impact whenever the direction of acceleration of said movable element changes.

RICHARD G. JEWELL.